(12) United States Patent
Liu et al.

(10) Patent No.: US 9,705,123 B2
(45) Date of Patent: Jul. 11, 2017

(54) BATTERY PACKAGING SYSTEM

(71) Applicant: Atieva, Inc., Menlo Park, CA (US)

(72) Inventors: Albert Liu, Palo Alto, CA (US); Guangyuan Zheng, Menlo Park, CA (US); Wilson Chou, Shanghai (CN)

(73) Assignee: ATIEVA, INC., Menlo Park, CA (US)

( * ) Notice: Subject to any disclaimer, the term of this patent is extended or adjusted under 35 U.S.C. 154(b) by 72 days.

(21) Appl. No.: 14/927,757

(22) Filed: Oct. 30, 2015

(65) Prior Publication Data

US 2017/0125782 A1    May 4, 2017

(51) Int. Cl.
*H01M 2/34*    (2006.01)

(52) U.S. Cl.
CPC .......... *H01M 2/34* (2013.01); *H01M 2200/00* (2013.01)

(58) Field of Classification Search
CPC ........ H01M 2/30; H01M 2/302; H01M 2/305; H01M 2/307; H01M 2/32; H01M 2/34; H01M 2/341; H01M 2/342; H01M 2/344; H01M 2/345; H01M 2/347; H01M 2/348
See application file for complete search history.

(56) References Cited

U.S. PATENT DOCUMENTS

| | | | |
|---|---|---|---|
| 2012/0031501 A1* | 2/2012 | Tuan ..................... | B64D 33/02 137/15.1 |
| 2012/0114981 A1* | 5/2012 | Cho ...................... | H01M 10/42 429/8 |
| 2012/0225331 A1* | 9/2012 | Tartaglia ............. | H01M 2/0267 429/50 |

\* cited by examiner

*Primary Examiner* — Muhammad Siddiquee
(74) *Attorney, Agent, or Firm* — Patent Law Office of David G. Beck (57) ABSTRACT

A battery enclosure is provided that externally shorts the enclosed battery, or batteries, immediately prior to the battery being punctured. As a result, the battery's state-of-charge is decreased, leading to a less severe reaction when the battery case is punctured.

11 Claims, 8 Drawing Sheets

BATTERY PACKAGING SYSTEM

FIELD OF THE INVENTION

The present invention relates generally to batteries and, more particularly, to a battery packaging system that is designed to minimize property risks and potential human harm when a battery is punctured.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, either contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. If the reaction rate and generation of heat go unabated, eventually the heat generated becomes great enough to cause the battery and materials in proximity to the battery to combust. While thermal runaway is typically the result of a battery short or a manufacturing defect, damage such as that which may occur during an accident or when road debris dents or punctures the battery pack may also lead to a thermal runaway event.

Due to the risk of a battery pack fire, hybrid and electric vehicle (EV) manufacturers use a variety of techniques to shield their battery packs from the possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs typically are forced to mount the pack under the car. To protect such a pack, a ballistic shield may be located between the road surface and the bottom of the pack as disclosed in U.S. Pat. Nos. 8,286,743 and 8,393,427.

Although the prior art teaches a variety of mounting techniques that can either be used to place the battery pack in a relatively protected region of a car or to otherwise shield the battery pack from potential harm, given the severity of the consequences accompanying a thermal runaway event, techniques for minimizing the effects of such an event are desired. The present invention provides a battery packing system that may be used to provide enhanced battery protection, thereby helping to decrease the likelihood of a damaged battery pack leading to a catastrophic battery pack event.

SUMMARY OF THE INVENTION

The present invention provides a battery pack that includes (i) at least one battery, where each battery of the at least one battery further comprises a first terminal and a second terminal; (ii) a battery pack enclosure configured to house the at least one battery; (iii) a first set of interconnects electrically connecting the first and second terminals of the at least one battery to a load; (iv) a first electrically conductive element, where a first end portion of the first electrically conductive element is electrically connected to the first terminal of the at least one battery, where a second end portion of the first electrically conductive element is adjacent to an inner surface of a region of the battery pack enclosure, and where the first end portion of the first electrically conductive element is distal from the second end portion of the first electrically conductive element; (v) a second electrically conductive element, where a first end portion of the second electrically conductive element is electrically connected to the second terminal of the at least one battery, where a second end portion of the second electrically conductive element is adjacent to an outer surface of the region of the battery pack enclosure, and where the first end portion of the second electrically conductive element is distal from the second end portion of the second electrically conductive element; and (vi) a layer of an electrically insulative material interposed between the second end portion of the first electrically conductive element and the second end portion of the second electrically conductive element, where an electrically conductive object will short out the at least one battery if it passes through the battery pack enclosure and electrically connects the second end portion of the first electrically conductive element to the second end portion of the second electrically conductive element.

In one aspect, the battery pack enclosure may be fabricated from an electrically insulative material or an electrically conductive material.

In another aspect, the layer of electrically insulative material may be interposed between the second end portion of the first electrically conductive element and the inner surface of the region of the battery pack enclosure or interposed between the second end portion of the second electrically conductive element and the outer surface of the region of the battery pack enclosure.

In another aspect, the layer of electrically insulative material may be interposed between the second end portion of the first electrically conductive element and the inner surface of the region of the battery pack enclosure and a second layer of a second electrically insulative material may be interposed between the second end portion of the second electrically conductive element and the outer surface of the region of the battery pack enclosure. The first and second electrically insulative materials may be the same or different materials.

In another aspect, the region of the battery pack enclosure may be comprised of at least a first portion of a first battery pack enclosure wall and a second portion of a second battery pack enclosure wall.

In another aspect, the battery pack enclosure may be configured to house a plurality of batteries, where the first end portion of the first electrically conductive element is electrically connected to the first terminal of each of the plurality of batteries, and where the first end portion of the second electrically conductive element is electrically connected to the second terminal of each of the plurality of batteries.

In another aspect, the battery pack enclosure may be configured to house a plurality of batteries, where the first end portion of the first electrically conductive element is electrically connected to the first terminal of a subset of the plurality of batteries, where the first end portion of the second electrically conductive element is electrically connected to the second terminal of the subset of the plurality of batteries, and where the electrically conductive object will short out the subset of the plurality of batteries if it passes through the battery pack enclosure and electrically connects the second end portion of the first electrically conductive element to the second end portion of the second electrically conductive element. The battery pack may further comprise (i) a third electrically conductive element, where a first end portion of the third electrically conductive element is electrically connected to the first terminal of a second subset of the plurality of batteries, where a second end portion of the third electrically conductive element is adjacent to an inner surface of a second region of the battery pack enclosure, and where the first end portion of the third electrically conductive element is distal from the second end portion of the third electrically conductive element; (ii) a fourth electrically conductive element, where a first end portion of the fourth electrically conductive element is electrically connected to the second terminal of the second subset of the plurality of batteries, where a second end portion of the fourth electrically conductive element is adjacent to an outer surface of the second region of the battery pack enclosure, where the first end portion of the fourth electrically conductive element is distal from the second end portion of the fourth electrically conductive element; and (iii) a second layer of an electrically insulative material interposed between the second end portion of the third electrically conductive element and the second end portion of the fourth electrically conductive element, and where the electrically conductive object will short out the second subset of the plurality of batteries if it passes through the battery pack enclosure and electrically connects the second end portion of the third electrically conductive element to the second end portion of the fourth electrically conductive element. A single material layer may comprise said first and second layers of electrically insulative material.

In another aspect, the battery pack may further comprise a plurality of electrically conductive elements, where a first end portion of each of the plurality of electrically conductive elements is electrically connected to the first terminal of the at least one battery, and where a second end portion of the of said plurality of electrically conductive elements is adjacent to each of a plurality of battery pack enclosure inner surface regions.

In another aspect, the battery pack may further comprise a plurality of electrically conductive elements, where a first end portion of each of the plurality of electrically conductive elements is electrically connected to the second terminal of the at least one battery, and where a second end portion of the of the plurality of electrically conductive elements is adjacent to each of a plurality of battery pack enclosure outer surface regions.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery form factors and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

A typical battery, for example a lithium ion battery, contains an electrode assembly that is comprised of an anode, a cathode and a separator that is interposed between the anode and the cathode. In a cylindrical battery, an anode sheet, a cathode sheet and interposed separator sheet are wound together in a spiral configuration that is commonly referred to as a "jelly roll." The electrode assembly as well as a suitable electrolyte is contained within a case, the material comprising the case being specifically selected to be non-reactive with both the electrode assembly and the electrolyte. To simplify fabrication, the case will often utilize an integral bottom closure, i.e., a seamless case bottom. The opposite end of the case is sealed with a cap assembly, this assembly often including multiple safety mechanisms (e.g., a current interrupt device or CID, one or more venting mechanisms, etc.). The two electrodes of the electrode assembly are connected to a pair of battery terminals which, in the case of a cylindrical battery, are commonly comprised of the battery case and a terminal integrated into the cap assembly.

A battery is susceptible to two types of shorting; external and internal. In an external short the two battery terminals are inadvertently connected by an electrically conductive object (e.g., an adjacent battery case, tool, etc.). This type of short typically occurs during handling, for example during battery pack assembly or repair. Internal shorts, which occur when the electrodes comprising the electrode assembly are electrically connected, are often due to a manufacturing error or abusive handling. When the internal short is due to an electrically conductive object such as a pin or nail puncturing the battery casing, multiple shorts may be created between the electrode layers. In addition to creating an internal short, puncturing the battery casing circumvents the battery's vent assembly, thereby allowing hot gas and flames to exit the case uncontrollably through the puncture hole in the case.

Batteries and battery packs may be used in any of a variety of scenarios ranging from mobile electronics and power tools to the large battery packs used in EVs. In general, designers attempt to protect the batteries from any type of abusive situation, both by monitoring and controlling day-to-day operation as well as utilizing protective enclosures and barriers. Unfortunately it is often difficult to protect a battery/battery pack from accidental damage, for example the type of damage that may occur to a power tool at a work site or to a battery pack mounted to an EV's undercarriage due to road debris. In these situations the designer will often add an additional barrier or increase the strength of the side or sides of the battery pack enclosure that is most likely to be struck and damaged by debris or other objects.

As noted above, when a battery is punctured by a conductive pin (e.g., a nail), the severity of the reaction is often much worse than the reaction that accompanies a simple external short. This difference in outcome severity is due in part to the number of electrode layers shorted when the casing is punctured. More significantly, the puncture bypasses the battery's venting assembly(s) and provides an easy pathway for flames, smoke, and debris to escape from the battery casing, often leading to a rapid escalation in event severity.

Figure 1:
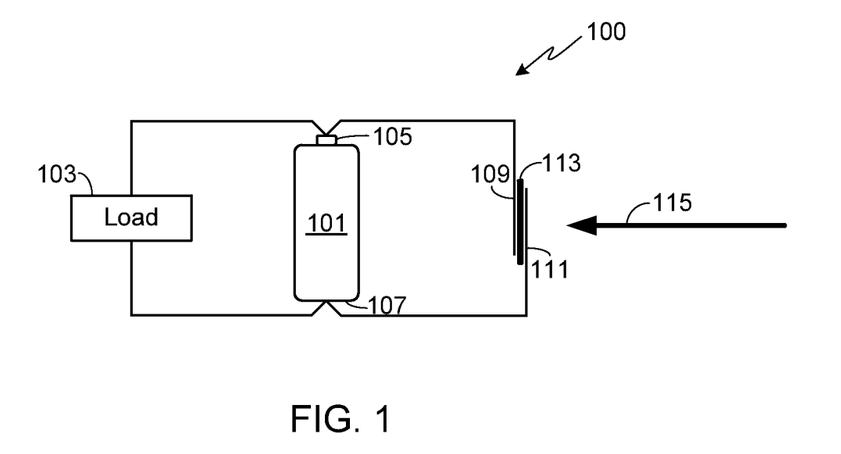
FIG. 1 provides a schematic of an embodiment of the invention.
Figure 2:
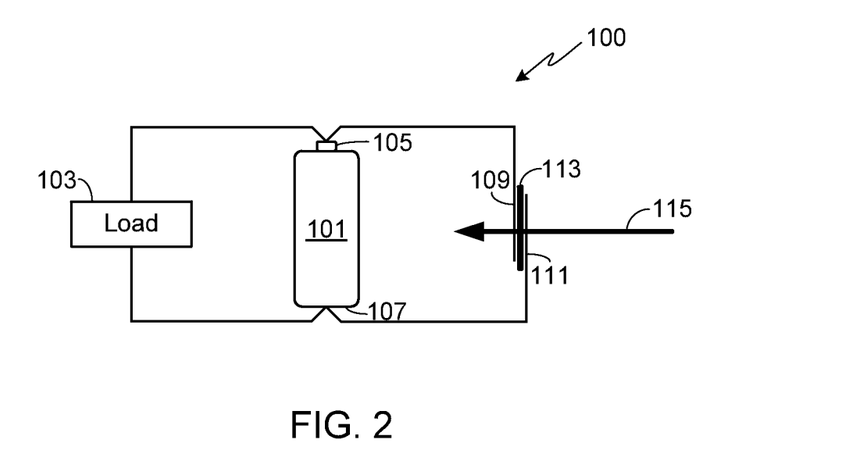
FIG. 2 provides a schematic of the embodiment shown in FIG. 1 after a conductive pin has punctured the battery enclosure but prior to the conductive pin puncturing the battery casing.
Figure 3:
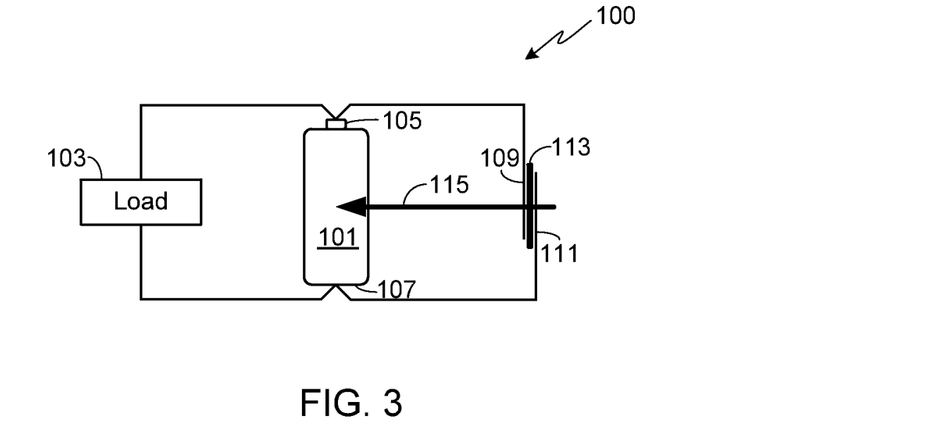
FIG. 3 provides a schematic of the embodiment shown in FIGS. 1 and 2 after the conductive pin has punctured the battery casing.

Since the severity of the reaction resulting from an internal short depends on the battery's state-of-charge (SOC), in accordance with the invention a battery enclosure is provided that externally shorts the enclosed battery (or batteries) immediately prior to it being punctured. As a result, the battery's SOC is decreased, leading to a less severe reaction when the battery case is punctured. FIGS. 1-3 schematically illustrate the invention.

In FIG. 1 a battery or batteries 101 provide energy to a load 103, where load 103 is coupled to battery 101 via a first terminal 105 and a second terminal 107. Load 103 may be the drive train of an EV or any other electrical device (e.g., laptop, power tool, etc.). Also electrically connected to first terminal 105 and second terminal 107 are a pair of complementary (i.e., aligned) electrically conductive elements 109 and 111, respectively. Conductive elements 109 and 111, which are preferably in the form of sheets, are separated by an electrical insulator 113. Insulator 113 may be comprised of air or, more preferably, comprised of a material layer fabricated from an electrically insulating material such as a plastic (e.g., glass-reinforced epoxy laminate or FR-4, fluorinated ethylene propylene or FEP, acrylonitrile butadiene styrene or ABS, modified polyphenylene oxide, polyimide, polystyrene, nylon, polyethylene terephthalate or PET, phenolic, etc.), ceramic, or rubber.

Also visible in FIG. 1 is an electrically conductive pin 115 which, at this point, has not yet struck the battery assembly 100. When pin 115 first impacts assembly 100 as shown in FIG. 2, it passes through conductive element 111, then through electrically insulative element 113, and then through conductive element 109. As pin 115 is comprised of an electrically conductive material, once it passes through both conductive elements 109 and 111 it will create an external short and cause battery 101 to discharge via the short circuit path. If pin 115 has sufficient force to continue its trajectory through battery 101 as shown in FIG. 3, the pin will create an internal short. Assuming that sufficient charge has been discharged by the external short, minimal damage in the form of smoke and flames results from puncturing battery 101 and producing an internal battery short.

Preferably the assembly's shorting conductive elements, e.g., elements 109 and 111 in FIG. 1, are incorporated into the battery's or battery pack's enclosure. FIGS. 4-16 illustrate a variety of embodiments in which the shorting elements are incorporated into the enclosure. It should be understood that these are only meant to illustrate various means of providing an early shorting system and as such, do not show every feature of the battery assembly utilizing the early shorting system of the invention.

Figure 4:
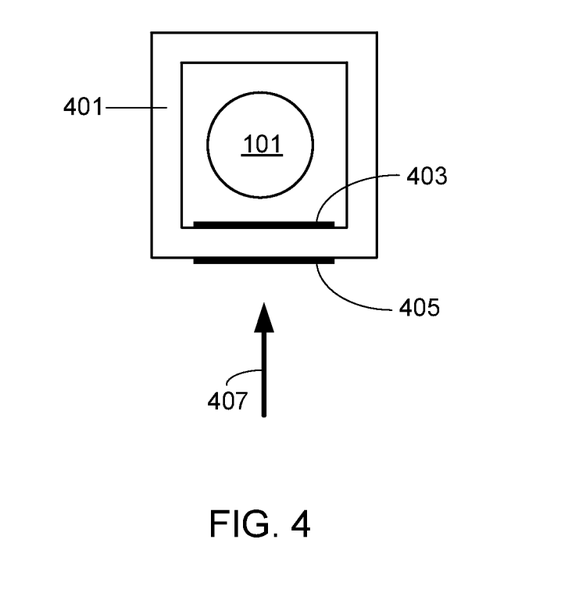
FIG. 4 provides a cross-sectional view of an exemplary battery enclosure in accordance with the invention in which the pack enclosure is fabricated from an electrically insulating material.

FIG. 4 provides a cross-sectional view of an exemplary battery enclosure 401. Cylindrical battery 101 is visible in this view. As shown, attached to an inner surface of enclosure 401 is a first conductive element 403, this element being electrically connected to a first terminal of battery 101. Similarly, attached to an outer surface of enclosure 401 is a second conductive element 405, this element being electrically connected to a second terminal of battery 101. Note that in this view the electrical connections between elements 403 and 405 and the respective battery terminals are not visible, nor are other electrical connections to the battery (e.g., the load connections).

Figure 5:
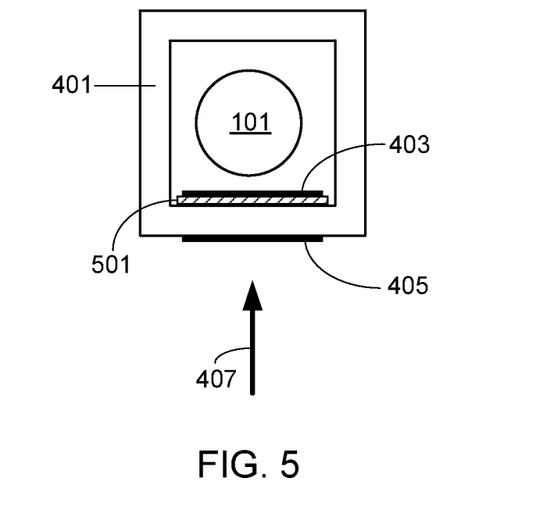
FIG. 5 provides a cross-sectional view of an exemplary battery enclosure, similar to the system shown in FIG. 4, except that the pack enclosure is fabricated from an electrically conductive material and a layer of an electrically insulating material is interposed between the pack enclosure and the inner shorting element.
Figure 6:
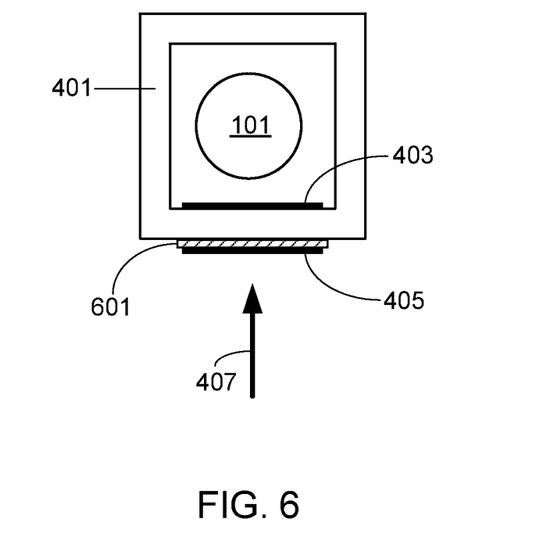
FIG. 6 provides a cross-sectional view of an exemplary battery enclosure, similar to the system shown in FIG. 4, except that the pack enclosure is fabricated from an electrically conductive material and a layer of an electrically insulating material is interposed between the pack enclosure and the outer shorting element.

In the embodiment illustrated in FIG. 4, enclosure 401 is fabricated from an electrically non-conductive material. If, however, the enclosure is fabricated from an electrically conductive material (e.g., aluminum, steel, etc.), an electrically insulative layer 501 may be interposed between an inner surface of enclosure 401 and element 403 as shown in FIG. 5, or an electrically insulative layer 601 may be interposed between an outer surface of enclosure 401 and element 405 as shown in FIG. 6. It will be appreciated that enclosure 401 could also include both an inner electrically insulative layer 501 as shown in FIG. 5 and an outer electrically insulative layer 601 as shown in FIG. 6. As described above relative to FIGS. 1-3, if a conductive object 407, such as a nail, impacts the enclosure and passes through the enclosure as well as elements 403 and 405, an external short is created, thereby lowering the enclosed battery's SOC prior to it being punctured by the same conductive object.

The configuration illustrated in FIGS. 4-6 is best suited to applications in which the battery pack enclosure is mounted in a region that provides protection to the enclosure on all sides except one. The exposed side, which is prone to damage, is the enclosure side that is protected by the shorting elements (e.g., elements 403 and 405) of the invention. Therefore in an application such as an EV in which the battery pack enclosure is mounted to the vehicle's undercarriage, the shorting elements of the invention would be used to protect the exposed battery pack surface that is directly adjacent to the roadway.

While it is preferable to mount the pack enclosure in a relatively well protected location, thereby minimizing the risk of the battery pack enclosure being compromised, given the numerous design requirements placed on a complex system such as an EV, selecting such a mounting location is not always possible. Accordingly, in some systems more than one wall of the battery pack enclosure is preferably protected by the external shorting elements of the invention. It will be appreciated that the exact configuration of the shorting system depends on the design of the battery pack, the materials used in the pack and the shorting system, and the desired manufacturing techniques. Some of the factors used in selecting the appropriate shorting system configuration include (i) whether or not the battery pack enclosure is electrically conductive or electrically insulative; (ii) the number of enclosure surfaces to be protected by the external shorting elements of the invention; (iii) assuming an electrically conductive enclosure, whether to include a single electrically insulating layer adjacent to the inner shorting element or a single electrically insulating layer adjacent to the outer shorting element or a pair of electrically insulating layers with one of the layers being adjacent to the inner shorting element and one of the layers being adjacent to the outer shorting element; and (iv) whether to use continuous or discontinuous insulating and/or shorting element layers.

Figure 7:
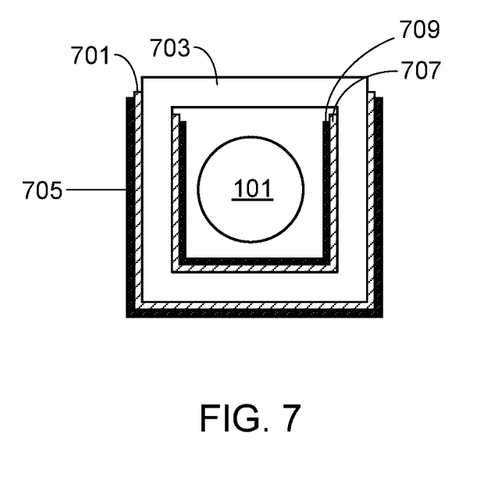
FIG. 7 provides a cross-sectional view of an exemplary battery enclosure in accordance with the invention in which the pack enclosure is fabricated from an electrically conductive material and shorting elements are included on three enclosure sides.
Figure 8:
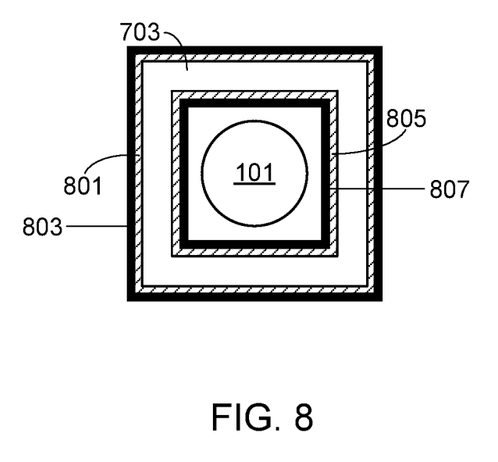
FIG. 8 provides a cross-sectional view of an exemplary battery enclosure in accordance with the invention in which the pack enclosure is fabricated from an electrically conductive material and shorting elements are included on four enclosure sides.
Figure 9:
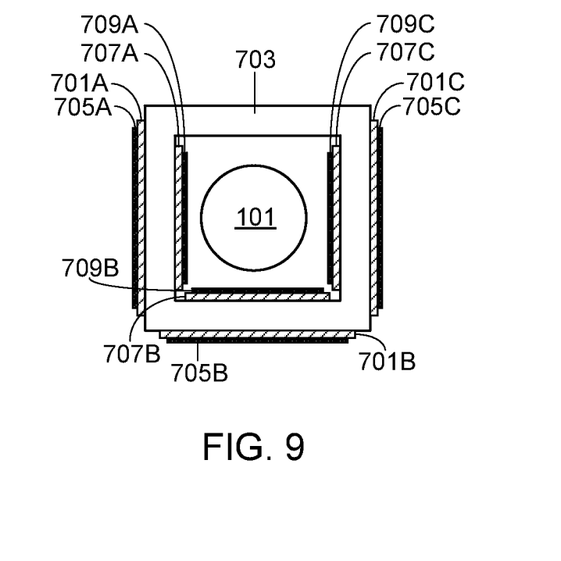
FIG. 9 provides a cross-sectional view of an exemplary battery enclosure, similar to the system shown in FIG. 7, except that the shorting and insulating layers are fabricated as discontinuous sections.
Figure 10:
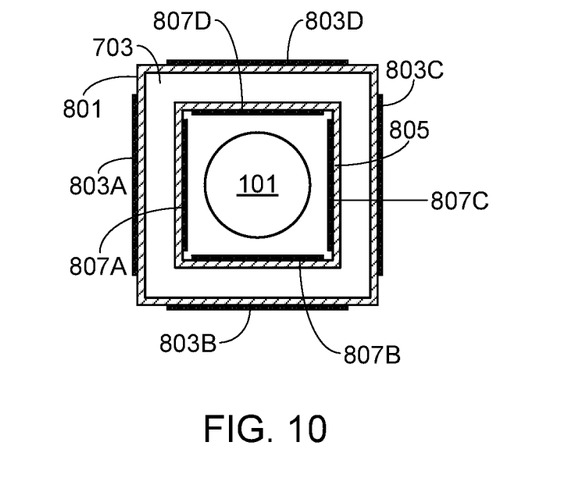
FIG. 10 provides a cross-sectional view of an exemplary battery enclosure, similar to the system shown in FIG. 8, except that the shorting layers are fabricated as discontinuous sections.

FIGS. 7 and 8 provide cross-sectional views of two exemplary configurations in which three and four sides, respectively, are protected by the external shorting elements. In these exemplary embodiments it is assumed that the battery pack enclosure is fabricated from an electrically conductive material (e.g., aluminum, steel, etc.). While the use of an electrically conductive enclosure requires the use of at least one electrically insulating layer, the illustrating embodiments shown in FIGS. 7 and 8 utilize a pair of insulating layers. Specifically, in the embodiment shown in FIG. 7 three sides of the battery pack enclosure include a first electrically insulating layer 701 interposed between enclosure 703 and the outer shorting element 705 and a second electrically insulating layer 707 interposed between enclosure 703 and the inner shorting element 709. Similarly, in the embodiment shown in FIG. 8 four sides of the battery pack enclosure include a first electrically insulating layer 801 interposed between enclosure 703 and the outer shorting element 803 and a second electrically insulating layer 805 interposed between enclosure 703 and the inner shorting element 807. As previously noted, the various layers comprising the external shorting system may be continuous as shown in FIGS. 7 and 8, or discontinuous. For example, FIG. 9 shows a configuration that is functionally equivalent to the configuration shown in FIG. 7 except that the shorting and insulating layers are fabricated as discontinuous sections. Accordingly, layer 701 in FIG. 7 is replaced with layer sections 701A, 701B and 701C in FIG. 9; layer 705 in FIG. 7 is replaced with layer sections 705A, 705B and 705C in FIG. 9; layer 707 in FIG. 7 is replaced with layer sections 707A, 707B and 707C in FIG. 9; and layer 709 in FIG. 7 is replaced with layer sections 709A, 709B and 709C in FIG. 9. FIG. 10 illustrates another configuration, based on the embodiment shown in FIG. 8, utilizing a pair of continuous insulating layers 801 and 805, a set of discontinuous outer shorting elements 803A-803D, and a set of discontinuous inner shorting elements 807A-807D.

While the embodiments illustrated in FIGS. 4-10 are shown with a single battery 101, it should be understood that the invention may also be used with battery enclosures containing a plurality of batteries. For example the embodiment illustrated in FIG. 11, which is based on the embodiment of FIG. 5, includes three batteries 101A-101C. In this configuration all three batteries are electrically connected to the external shorting elements 403 and 405. As a result, if an electrically conductive object, such as a nail, penetrates the battery enclosure 401 and passes through both the outer shorting element 405 and the inner shorting element 403, all three batteries 101A-101C are externally shorted.

Figure 11:
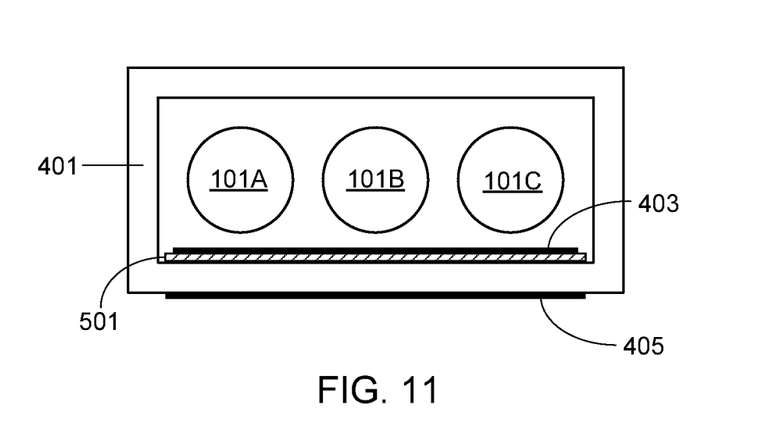
FIG. 11 provides a cross-sectional view of an exemplary battery enclosure, based on the system shown in FIG. 4, except that the pack enclosure includes three batteries.
Figure 12:
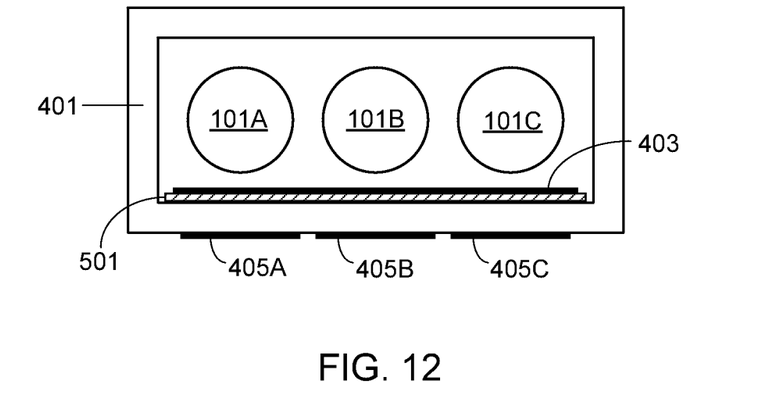
FIG. 12 provides a cross-sectional view of an exemplary battery enclosure, based on the system shown in FIG. 11, except that the outer shorting layer is fabricated as a plurality of outer shorting layers, each of which is electrically connected to a single battery within the battery enclosure.
Figure 13:
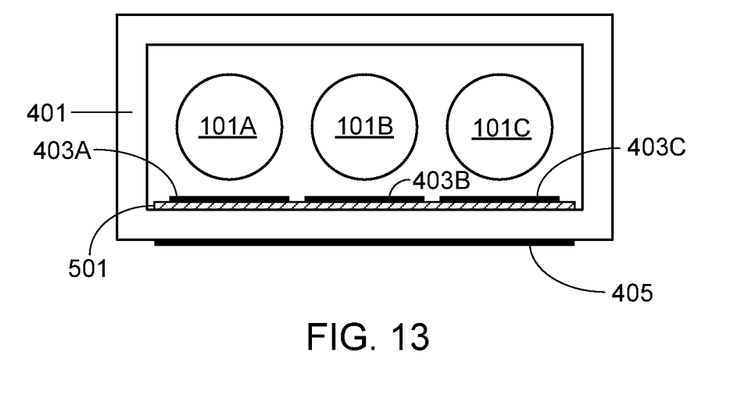
FIG. 13 provides a cross-sectional view of an exemplary battery enclosure, based on the system shown in FIG. 11, except that the inner shorting layer is fabricated as a plurality of inner shorting layers, each of which is electrically connected to a single battery within the battery enclosure.
Figure 14:
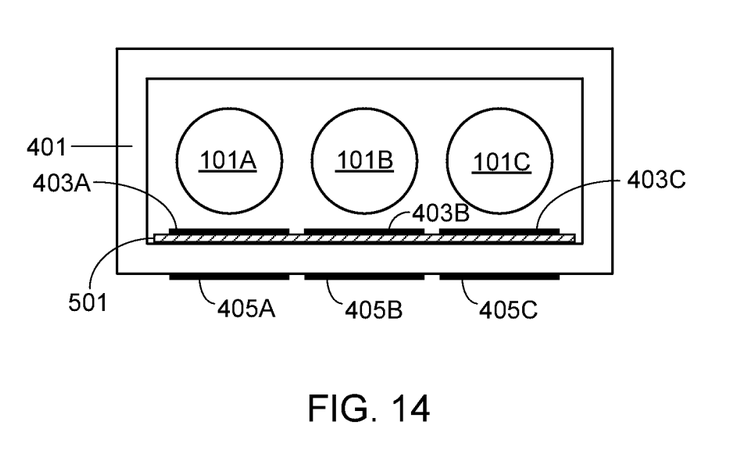
FIG. 14 provides a cross-sectional view of an exemplary battery enclosure, based on the system shown in FIG. 11, except that the outer shorting layer is fabricated as a plurality of outer shorting layers and the inner shorting layer is fabricated as a plurality of inner shorting layers.
Figure 15:
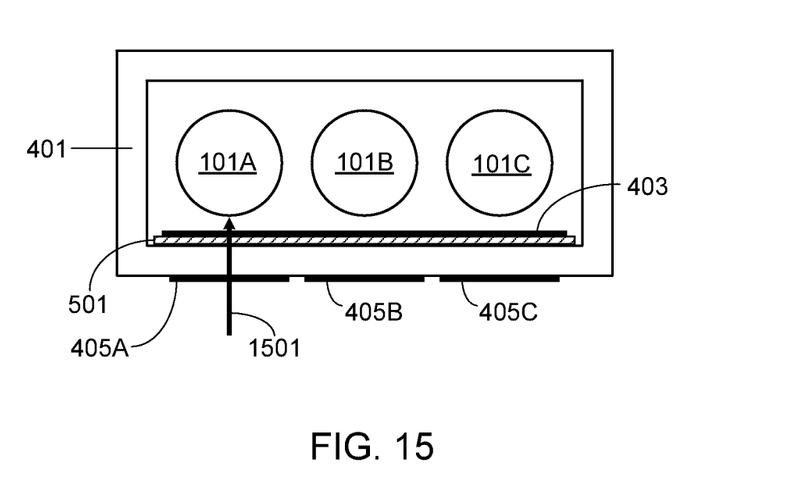
FIG. 15 provides a cross-sectional view of an exemplary battery enclosure, based on the system shown in FIG. 12, illustrating the effects of a conductive element passing through, and electrically coupling, the inner and outer shorting elements.

In the embodiment illustrated in FIG. 11, all three of the contained batteries are shorted even if only one of the batteries is about to be punctured. FIGS. 12-14 illustrate three alternate configurations for use with an enclosure containing multiple batteries, each of these configurations based on the embodiment shown in FIG. 5. In these embodiments, rather than unnecessarily shorting all of the batteries when the case is punctured by a conductive object, only the battery closes to the puncture site is shorted. As shown, the embodiment of FIG. 12 includes three outer shorting elements 405A-405C that are electrically connected to batteries 101A-101C, respectively. This embodiment includes a single inner shorting element 403 electrically connected to all three of the batteries. The embodiment of FIG. 13 is similar to that of FIG. 12, except that a single outer shorting element is connected to all three batteries and three inner shorting elements 403A-403C are electrically connected to batteries 101A-101C, respectively. FIG. 14 uses multiple outer shorting elements 405A-405C as shown in FIG. 12 and multiple inner shorting elements 403A-403C as shown in FIG. 13. FIG. 15, based on the configuration shown in FIG. 12, illustrates the concept of the exemplary embodiments shown in FIGS. 12-14. Specifically, when a conductive object 1501 penetrates enclosure 401 and passes through shorting element 405A and 403, only battery 101A is externally shorted.

Figure 16:
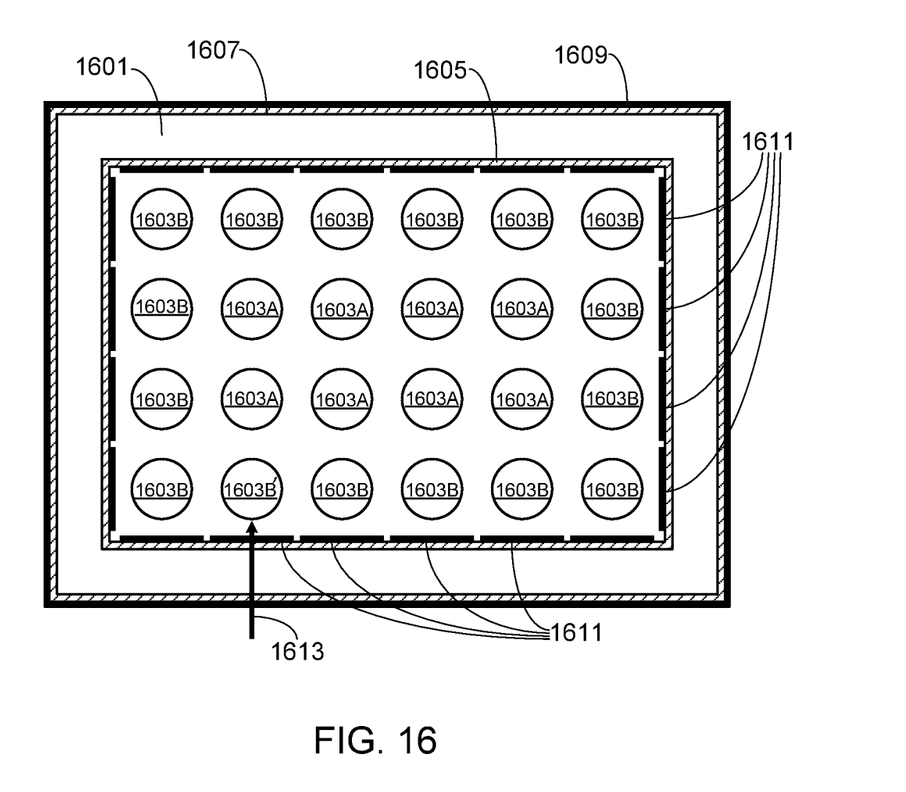
FIG. 16 provides a cross-sectional view of an exemplary battery enclosure in which some of the batteries contained within the enclosure are not adjacent to a pack enclosure wall.

FIG. 16 illustrates another embodiment of the invention, one in which some of the batteries contained within the battery pack are not adjacent to a pack enclosure wall. In the exemplary embodiment of FIG. 16, twenty-four batteries are contained within battery pack enclosure 1601, eight of which are not adjacent to a pack enclosure wall (i.e., batteries 1603A) and sixteen of which are adjacent to a pack enclosure wall (i.e., batteries 1603B). The batteries within battery pack enclosure 1601 may be electrically connected in series, electrically connected in parallel, or in some combination thereof. As previously described, while the battery pack enclosure may be fabricated from an electrically insulating material, in those instances in which it is fabricated from an electrically conductive material (e.g., aluminum, steel, etc.) it is necessary to interpose an electrically insulating layer between the enclosure and the inner shorting element(s), or between the enclosure and the outer shorting element(s), or both as in configuration 1600 that includes an inner electrically insulating layer 1605 and an outer electrically insulating layer 1607. With respect to the design of the inner and outer shorting elements, while they may be fabricated as continuous or discontinuous elements as described above, preferably at least one of the shorting elements is fabricated as a plurality of individual shorting elements, each of which corresponds to less than the total number of batteries in the pack, and preferably each of which corresponds to a single battery. By fabricating at least one of the shorting elements as a plurality of individual shorting elements, when the battery pack is punctured by a conductive object (e.g., a nail), the system will not short out all of the batteries. In exemplary configuration 1600 the system is designed to externally short only a single battery upon enclosure penetration, and in particular the single battery that is adjacent to a particular shorting element and therefore most likely to be punctured by an object penetrating the battery pack at that location. As shown in FIG. 16, the outer shorting element 1609 is continuous while the inner shorting element is comprised of a plurality of shorting element 1611, each of which is electrically connected to the immediately adjacent battery 1603B. As a result of this configuration, if a nail 1613 passes through the enclosure as shown, only battery 1603B' is shorted out.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack, comprising:
a plurality of batteries, wherein each battery of said plurality of batteries comprises a first terminal and a second terminal;
a battery pack enclosure configured to house said plurality of batteries;
a first set of interconnects electrically connecting said first and second terminals of said plurality of batteries to a load;
a primary electrically conductive element, wherein a first end portion of said primary electrically conductive element is electrically connected to said first terminal of said each battery of said plurality of batteries, wherein a second end portion of said primary electrically conductive element is adjacent to a first surface of a region of said battery pack enclosure, and wherein said first end portion of said primary electrically conductive element is distal from said second end portion of said primary electrically conductive element;
a plurality of secondary electrically conductive elements, wherein each of said plurality of secondary electrically conductive elements corresponds to one of said plurality of batteries, wherein a first end portion of each of said plurality of secondary electrically conductive elements is electrically connected to said second terminal of said corresponding one of said plurality of batteries, wherein a second end portion of each of said plurality of secondary electrically conductive elements is proximate to said corresponding one of said plurality of batteries, wherein said second end portion of each of said plurality of secondary electrically conductive elements is adjacent to a second surface of said region of said battery pack enclosure, and wherein said first end portion of each of said plurality of secondary electrically conductive elements is distal from said second end portion of said each of said plurality of secondary electrically conductive elements; and
a layer of an electrically insulative material interposed between said second end portion of said primary electrically conductive element and said second end portion of each of said plurality of secondary electrically conductive elements, wherein an electrically conductive object will short out said corresponding one of said plurality of batteries if said electrically conductive object passes through said battery pack enclosure and electrically connects said second end portion of said primary electrically conductive element to said second end portion of said corresponding secondary electrically conductive element.

2. The battery pack of claim 1, said layer of said electrically insulative material interposed between said second end portion of said primary electrically conductive element and said first surface of said region of said battery pack enclosure.

3. The battery pack of claim 1, said layer of said electrically insulative material interposed between said second end portion of each of said plurality of secondary electrically conductive elements and said second surface of said region of said battery pack enclosure.

4. The battery pack of claim 1, further comprising a second layer of a second electrically insulative material, wherein said layer of said electrically insulative material is interposed between said second end portion of said primary electrically conductive element and said first surface of said region of said battery pack enclosure, and wherein said second layer of said second electrically insulative material is interposed between said second end portion of each of said plurality of secondary electrically conductive elements and said second surface of said region of said battery pack enclosure.

5. The battery pack of claim 1, wherein said second end portion of each of said plurality of secondary electrically conductive elements is adjacent to a corresponding portion of said second surface of said region of said battery pack enclosure.

6. The battery pack of claim 1, said layer of said electrically insulative material interposed between said second end portion of said second electrically conductive element and said outer surface of said region of said battery pack enclosure.

7. The battery pack of claim 1, further comprising a second layer of a second electrically insulative material, wherein said layer of said electrically insulative material is interposed between said second end portion of said first electrically conductive element and said inner surface of said region of said battery pack enclosure, and wherein said second layer of said second electrically insulative material is interposed between said second end portion of said second electrically conductive element and said outer surface of said region of said battery pack enclosure.

8. The battery pack of claim 7, wherein said second electrically insulative materials is the same as said first electrically insulative material.

9. The battery pack of claim 1, wherein said region of said battery pack enclosure is comprised of a portion of a battery pack enclosure wall.

10. The battery pack of claim 1, wherein said region of said battery pack enclosure is comprised of at least a first portion of a first battery pack enclosure wall and a second portion of a second battery pack enclosure wall.

11. The battery pack of claim 1, further comprising a plurality of electrically conductive elements, wherein a first end portion of each of said plurality of electrically conductive elements is electrically connected to said first terminal of said at least one battery, and wherein a second end portion of each of said plurality of electrically conductive elements is adjacent to each of a plurality of battery pack enclosure inner surface regions.

* * * * *